US008903708B2

(12) United States Patent
Derks et al.

(10) Patent No.: US 8,903,708 B2
(45) Date of Patent: Dec. 2, 2014

(54) ANALYZING RESTAURANT MENUS IN VIEW OF CONSUMER PREFERENCES

(75) Inventors: Patrick J. Derks, Seattle, WA (US); Atulkumar Desai, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 364 days.

(21) Appl. No.: 13/370,959

(22) Filed: Feb. 10, 2012

(65) Prior Publication Data
US 2013/0211814 A1    Aug. 15, 2013

(51) Int. Cl.
G06Q 50/00    (2012.01)
G06F 17/28    (2006.01)

(52) U.S. Cl.
USPC ............... 704/2; 704/277; 705/2; 705/15

(58) Field of Classification Search
CPC ....... G06F 17/28; G06F 17/289; G06Q 50/00; G06Q 50/12; G06Q 50/22
USPC ........... 704/2, 3, 7, 8, 270, 270.1, 277; 705/2, 705/14.1, 15
See application file for complete search history.

(56) References Cited

U.S. PATENT DOCUMENTS

| | | | |
|---|---|---|---|
| 7,734,729 B2 | 6/2010 | Du et al. | |
| 7,953,873 B1 * | 5/2011 | Madurzak | 709/229 |
| 8,201,156 B1 * | 6/2012 | Pohorsky et al. | 717/142 |
| 8,494,896 B1 * | 7/2013 | Lagana | 705/7.29 |
| 8,655,717 B2 * | 2/2014 | Schwarzberg et al. | 705/14.1 |
| 2002/0055857 A1 * | 5/2002 | Mault | 705/2 |
| 2005/0075934 A1 * | 4/2005 | Knight et al. | 705/15 |
| 2005/0171800 A1 * | 8/2005 | Yamaguchi | 705/1 |
| 2006/0155665 A1 * | 7/2006 | Sekiyama | 706/59 |
| 2006/0169772 A1 | 8/2006 | Page et al. | |
| 2006/0259307 A1 * | 11/2006 | Sanders et al. | 705/1 |
| 2006/0271394 A1 * | 11/2006 | Kelly | 705/1 |
| 2007/0174212 A1 * | 7/2007 | Hintermeister et al. | 705/400 |
| 2009/0012704 A1 | 1/2009 | Franco et al. | |
| 2009/0164466 A1 * | 6/2009 | Badyal | 707/7 |
| 2009/0192901 A1 * | 7/2009 | Egeresi | 705/15 |
| 2009/0234700 A1 | 9/2009 | Galvin et al. | |
| 2009/0265447 A1 | 10/2009 | Lee et al. | |
| 2009/0276300 A1 | 11/2009 | Shaw et al. | |
| 2010/0138304 A1 | 6/2010 | Boyarsky et al. | |
| 2010/0161434 A1 | 6/2010 | Herwig et al. | |
| 2010/0241496 A1 | 9/2010 | Gupta et al. | |
| 2010/0332333 A1 * | 12/2010 | Neff | 705/15 |
| 2011/0046939 A1 * | 2/2011 | Balasaygun | 704/2 |
| 2011/0145093 A1 | 6/2011 | Paradise et al. | |

(Continued)

Primary Examiner — Martin Lerner
(74) Attorney, Agent, or Firm — Bryan Webster; Kate Drakos; Micky Minhas

(57) ABSTRACT

A system and method are described for analyzing a menu. In one embodiment, a mobile device can obtain a digital version of a restaurant menu. A list of food criteria can be stored on the mobile device and tailored to a particular user of the mobile device. The restaurant menu can then be filtered using the stored list of food criteria to display a reduced version of the restaurant menu with items that conflict with the food criteria removed. In another embodiment, the digital version of the menu can be translated. For example, a destination language can be based on a language setting in the mobile device. A source language can either be entered by the user, determined automatically by comparing words in the menu itself against dictionaries in different languages, or by using geographic location of the restaurant.

20 Claims, 8 Drawing Sheets

(56) References Cited

U.S. PATENT DOCUMENTS

| | | | |
|---|---|---|---|
| 2011/0318717 A1* | 12/2011 | Adamowicz | 434/127 |
| 2012/0233002 A1* | 9/2012 | Abujbara | 705/15 |
| 2012/0323707 A1* | 12/2012 | Urban | 705/15 |
| 2014/0067364 A1* | 3/2014 | Wren et al. | 704/2 |

* cited by examiner

US 8,903,708 B2

ANALYZING RESTAURANT MENUS IN VIEW OF CONSUMER PREFERENCES

FIELD

The present application relates generally to menus, and, particularly, to matching consumer preferences (e.g., dietary, pricing, etc.) to a restaurant menu.

BACKGROUND

Every day millions of people eat out at restaurants all over the world. For many customers, it's a common task to scan the restaurant menu to look for those menu items that meet their predetermined dietary preferences. Such preferences could include total calories, cholesterol, price, ingredients (for those with allergies) etc. Also, for those individuals travelling to foreign countries it is common to have to translate menu items or ingredients.

These tasks can be very time consuming. Looking over numerous menu options that are not applicable to a patron can be frustrating. Additionally, for some consumers, medical conditions, such as high-blood pressure, high cholesterol, etc. may dictate that the consumer avoid certain ingredients. Thus, eating in a foreign country can be unnecessarily dangerous.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, a mobile device can obtain a digital version of a restaurant menu. A list of food criteria can be stored on the mobile device and tailored to a particular user of the mobile device. The restaurant menu can then be filtered using the stored list of food criteria to display a reduced version of the restaurant menu with conflicting items removed.

In another embodiment, the digital version of the menu can be translated. For example, a destination language can be based on a language setting in the mobile device. A source language can either be entered by the user, determined automatically by comparing words in the menu itself against dictionaries in different languages, or by using geographic location of the restaurant. Additionally, the translation can occur using a cloud service or locally in the mobile device.

Using the system and method described herein, a user can quickly and efficiently determine whether menu items satisfy the user's needs, including dietary needs and/or pricing. Additionally, a user can be assisted to ensure that food is not ordered which contains ingredients that are undesirable or even medically dangerous for the user. Finally, translations can be provided to ease the user's ability to negotiate menu choices in a foreign language.

The foregoing and other objects, features, and advantages of the invention will become more apparent from the following detailed description, which proceeds with reference to the accompanying figures.

DETAILED DESCRIPTION

Figure 1:
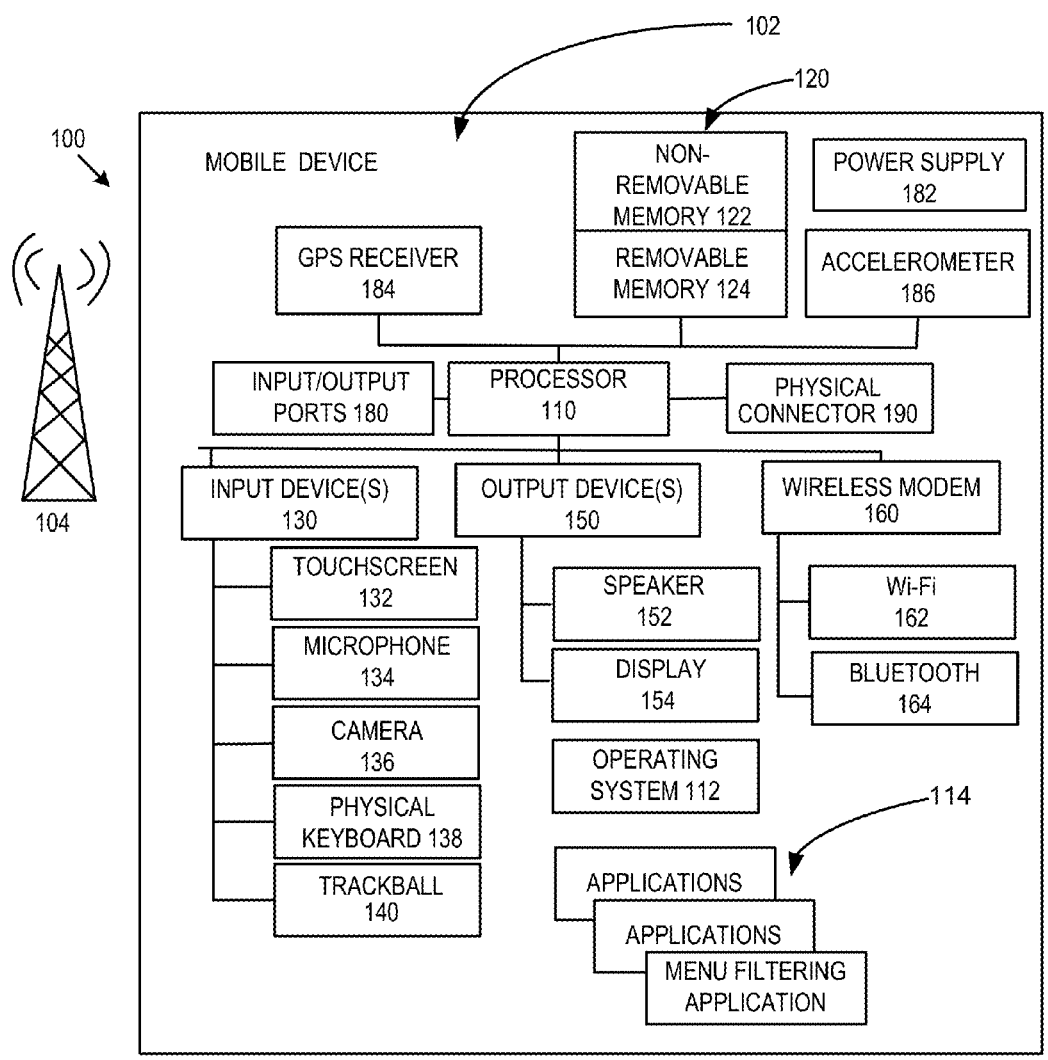
FIG. 1 is a hardware diagram of an exemplary mobile device that can be used in any of the embodiments described herein.

FIG. 1 is a system diagram depicting an exemplary mobile device 100 including a variety of optional hardware and software components, shown generally at 102. Any components 102 in the mobile device can communicate with any other component, although not all connections are shown, for ease of illustration. The mobile device can be any of a variety of computing devices (e.g., cell phone, smartphone, handheld computer, Personal Digital Assistant (PDA), etc.) and can allow wireless two-way communications with one or more mobile communications networks 104, such as a cellular or satellite network.

The illustrated mobile device 100 can include a controller or processor 110 (e.g., signal processor, microprocessor, ASIC, or other control and processing logic circuitry) for performing such tasks as signal coding, data processing, input/output processing, power control, and/or other functions. An operating system 112 can control the allocation and usage of the components 102 and support for one or more application programs 114. The application programs can include common mobile computing applications (e.g., email applications, calendars, contact managers, web browsers, messaging applications), or any other computing application. One of the applications shown is a menu filtering application, as described further below.

The illustrated mobile device 100 can include memory 120. Memory 120 can include non-removable memory 122 and/or removable memory 124. The non-removable memory 122 can include RAM, ROM, flash memory, a hard disk, or other well-known memory storage technologies. The removable memory 124 can include flash memory or a Subscriber Identity Module (SIM) card, which is well known in GSM communication systems, or other well-known memory storage technologies, such as "smart cards." The memory 120 can be used for storing data and/or code for running the operating system 112 and the applications 114. Example data can include web pages, text, images, sound files, video data, or other data sets to be sent to and/or received from one or more network servers or other devices via one or more wired or wireless networks. The memory 120 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The mobile device 100 can support one or more input devices 130, such as a touchscreen 132, microphone 134, camera 136, physical keyboard 138 and/or trackball 140 and one or more output devices 150, such as a speaker 152 and a display 154. Other possible output devices (not shown) can include piezoelectric or other haptic output devices. Some devices can serve more than one input/output function. For example, touchscreen 132 and display 154 can be combined in a single input/output device.

A wireless modem 160 can be coupled to an antenna (not shown) and can support two-way communications between the processor 110 and external devices, as is well understood in the art. The modem 160 is shown generically and can include a cellular modem for communicating with the mobile communication network 104 and/or other radio-based modems (e.g., Bluetooth 164 or Wi-Fi 162). The wireless modem 160 is typically configured for communication with one or more cellular networks, such as a GSM network for data and voice communications within a single cellular network, between cellular networks, or between the mobile device and a public switched telephone network (PSTN).

The mobile device can further include at least one input/output port 180, a power supply 182, a satellite navigation system receiver 184, such as a Global Positioning System (GPS) receiver, an accelerometer 186, and/or a physical connector 190, which can be a USB port, IEEE 1394 (FireWire) port, and/or RS-232 port. The illustrated components 102 are not required or all-inclusive, as any components can deleted and other components can be added.

Figure 2:
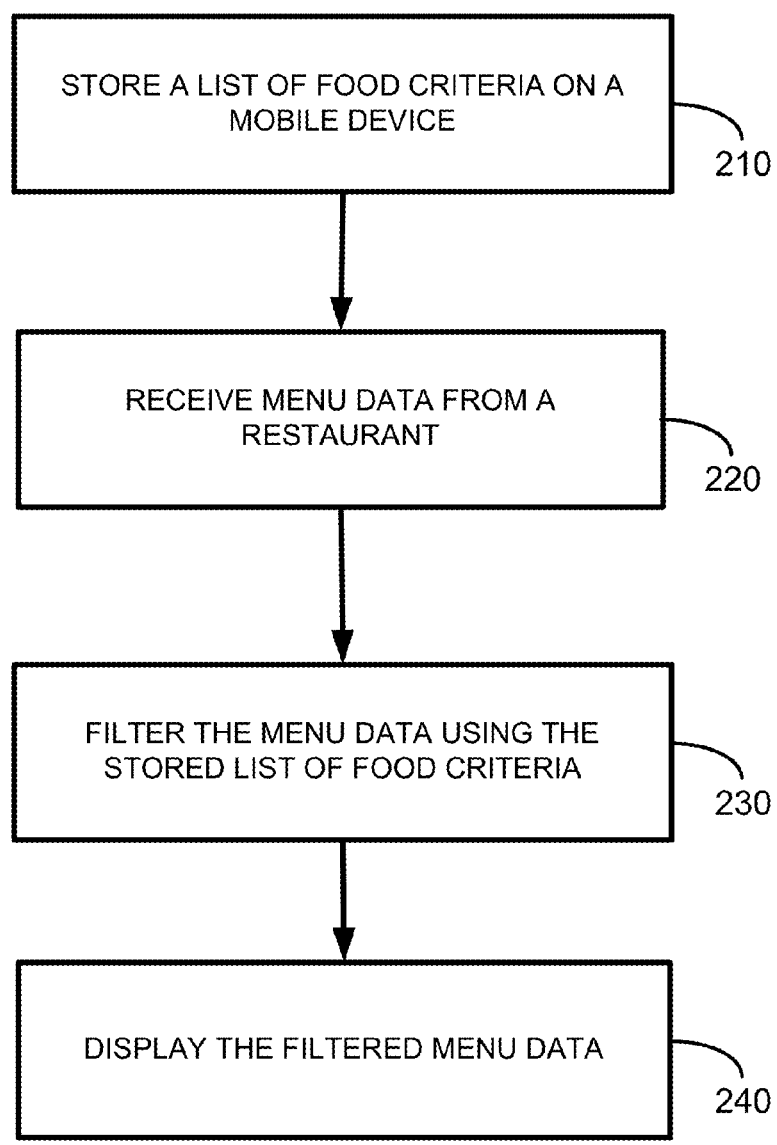
FIG. 2 is an exemplary flowchart of a method for filtering menu data.

FIG. 2 shows an exemplary flowchart of a method for displaying a filtered menu. In process block 210, a list of food criteria can be stored on the mobile device. The food criteria can include a list of ingredients or other filter parameters, such as price. As explained further below, the list of ingredients can be received by the mobile device in numerous ways, such as by a user through a user interface, generated by the mobile device based on the user's medical information, etc. Generally, the list of ingredients can include ingredients to which the user has an allergy or can be ingredients that exacerbate a medical condition or even ingredients that the user does not like (e.g., raisins). Any of these ingredients can be considered problematic or undesirable ingredients for the user. In process block 220, menu data can be received from a restaurant or other eating establishment. The menu data can include the names of dishes (e.g., food items), ingredients, pricing, quantity, etc. associated with the dishes. In process block 230, the menu data can be filtered using the stored list of food criteria. For example, an automatic comparison can be made between the ingredients in the menu data and the ingredients stored in the list of food criteria. When an ingredient in the menu data matches the list of food criteria, that associated menu item is filtered out or otherwise excluded from a final list of menu data. As a result, a reduced list (or transformed list) of menu data is included in the filtered list. In process block 240, the filtered menu data is displayed. Thus, the filtered menu data is a subset of the menu data received from the restaurant so that the user has less information to review.

Figure 3:
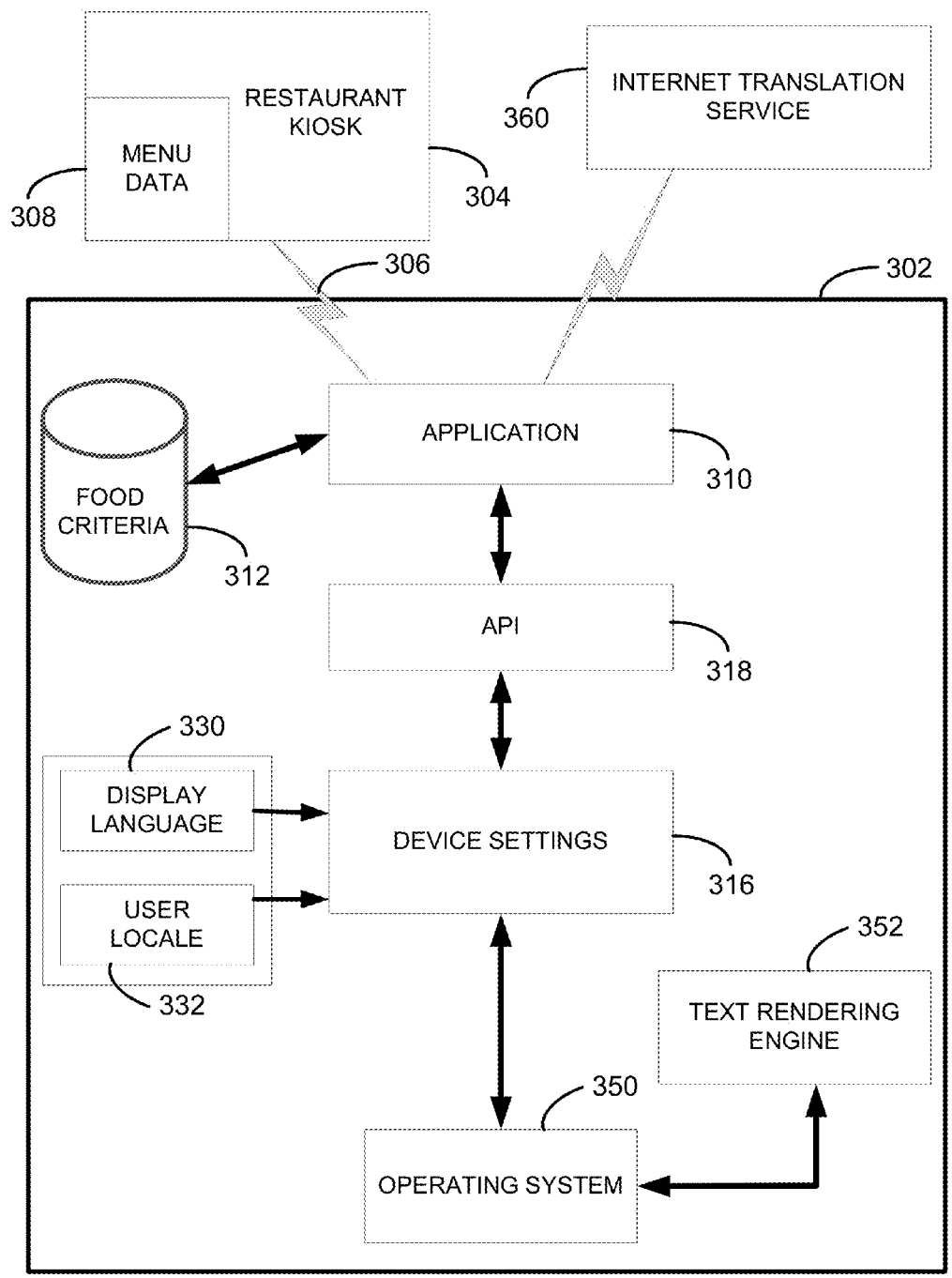
FIG. 3 is an exemplary system diagram that can be used for filtering and/or translating menu data.

FIG. 3 is an exemplary system that can be used for displaying menu data received from a restaurant in a mobile device 302. The restaurant can have a kiosk 304 with a short-range communication standard, such as near-field (NFC), blue tooth technology, etc., for communicating with the mobile device, as illustrated at 306. The restaurant kiosk can have stored data 308, which can include menu items (e.g., names) and ingredients used in those menu items. Other data can also be used, such as pricing, quantity, etc. When the mobile device 302 is within a predetermined distance from the kiosk 304, a communication can be established between the two and the menu data 308 can be downloaded to the application. Additionally, the stored list of food criteria can be sent to the restaurant server or kiosk, so that the restaurant server can send, in return, further recommendations based on the list. An application 310 can access food criteria stored locally in memory 312 on the mobile device. Additionally, the application 310 can support a translation of the menu items. For example, the application 310 can access device settings 316 through an API 318. The device settings 316 can include a stored display language 330 and a user locale 332. The display language 330 can be set by the user and can include the language that is displayed by the operating system for standard mobile device features. The user locale 332 can be stored data based on the current geographic location of the mobile device, such as the country in which the mobile device currently resides. An operating system 350 can be used to access the device settings 316 and pass such settings to the API 318. Additionally, the application 310 can communicate menu data to be displayed through the operating system 350 for display using a text rendering engine 352. If translations are needed, the application 310 can access an Internet translation service 360. Based on the display language (used as a destination language) and a source language of the menu data, the Internet translation service 360 can provide translations of data supplied by the application 310. In one example, menu data 308 can be passed to the translation service 360 via the application 310 along with a destination language obtained from display field 330. The source language can also be determined by the Internet translation service 360 through analysis of the menu data, as is understood in the art, or the source language can be passed to the service 360 using the user locale data 332.

Figure 4:
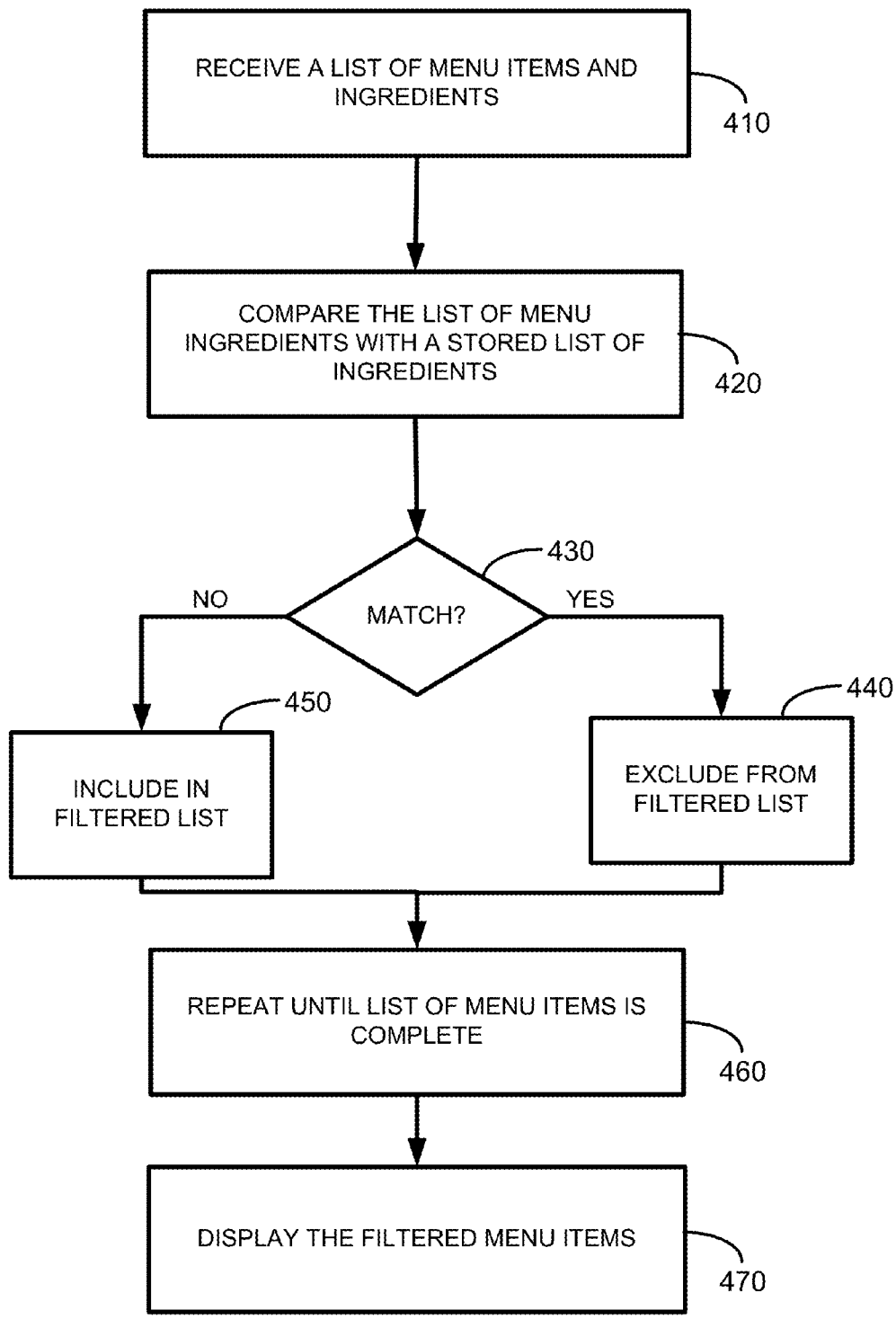
FIG. 4 is an exemplary flowchart of a method showing additional details for filtering menu data.

FIG. 4 is an exemplary flowchart of a method for displaying filtered menu items. In process block 410, a list of menu items and associated ingredients can be received in a mobile device. Additional information can also be provided, such as pricing, a quantity of the ingredients, etc. For example, additional information could specify that a cup of sugar is used or a percentage of sugar as part of a menu item. For illustrative purposes, only the ingredients will be described, but it is well understood that any of the additional information can be used instead, or in addition to, the ingredients. As previously described, the list can come from a network device through near-field technology, blue tooth, Wi-Fi, etc. In process block 420, the list of ingredients can be compared against a stored list of ingredients. The stored list of ingredients can include ingredients that are undesirable or medically prohibited for use by the user. In decision block 430, if a match is found between the received list of ingredients and the stored list, then in process block 440, the matched menu item is excluded from the filtered list. Otherwise, in process block 450, the unmatched menu item is included in the filtered list. In process block 460, the comparison can be repeated for the received list of menu items and ingredients. Thus, process blocks 420-450 are repeated to generate a filtered list of menu items. In process block 470, the filtered list of menu items can be displayed. By displaying a filtered list of menu data, the user can much easier discern the menu items that are available for the user at the restaurant.

Figure 5:
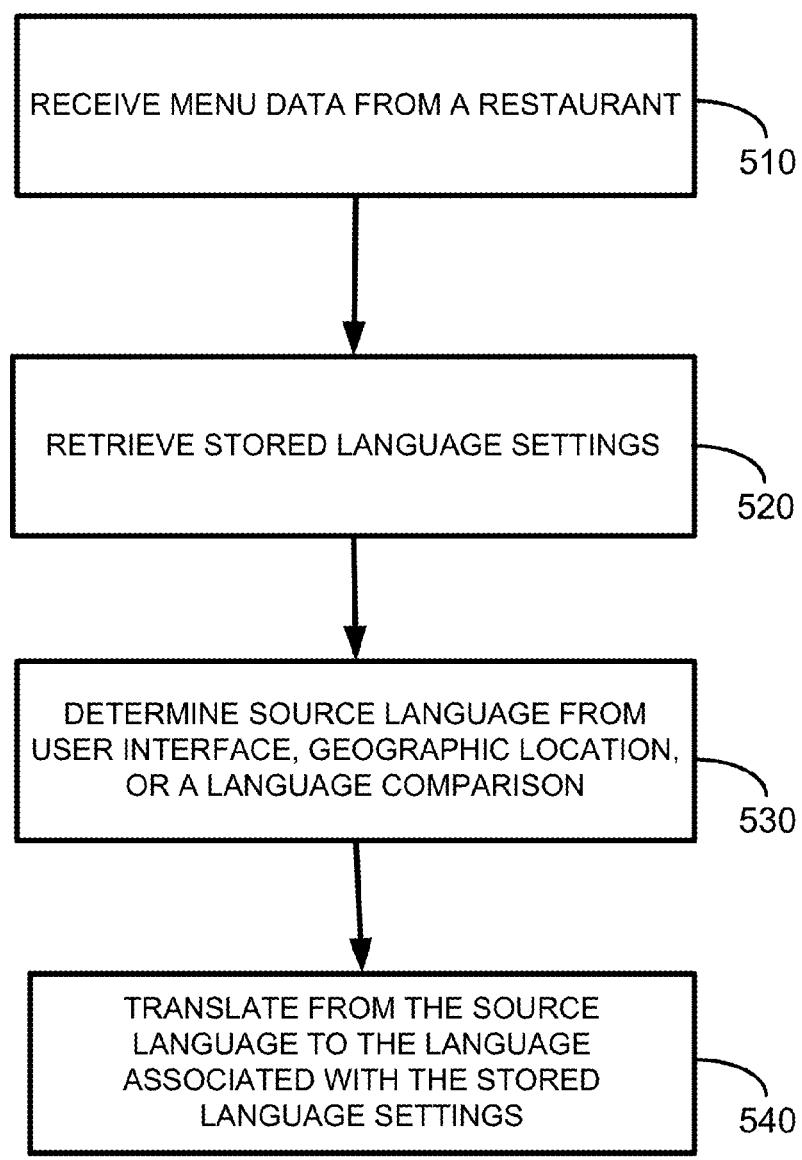
FIG. 5 is an exemplary flowchart of a method for translating menu data.

FIG. 5 is a flowchart of a method for translating menu data. In process block 510, the menu data is received from a restaurant. In process block 520, language settings are retrieved from the mobile device. The language settings can be used as the destination language. In process block 530, a source language is determined. The source language can be received from the user interface, such as by the user entering the source language. Alternatively, a geographic location can be retrieved from settings on the mobile device. Finally, a language comparison can be performed for automatic determination of the source language. In process block 540, a translation is performed from the source language to the language associated with the stored language settings.

Figure 6:
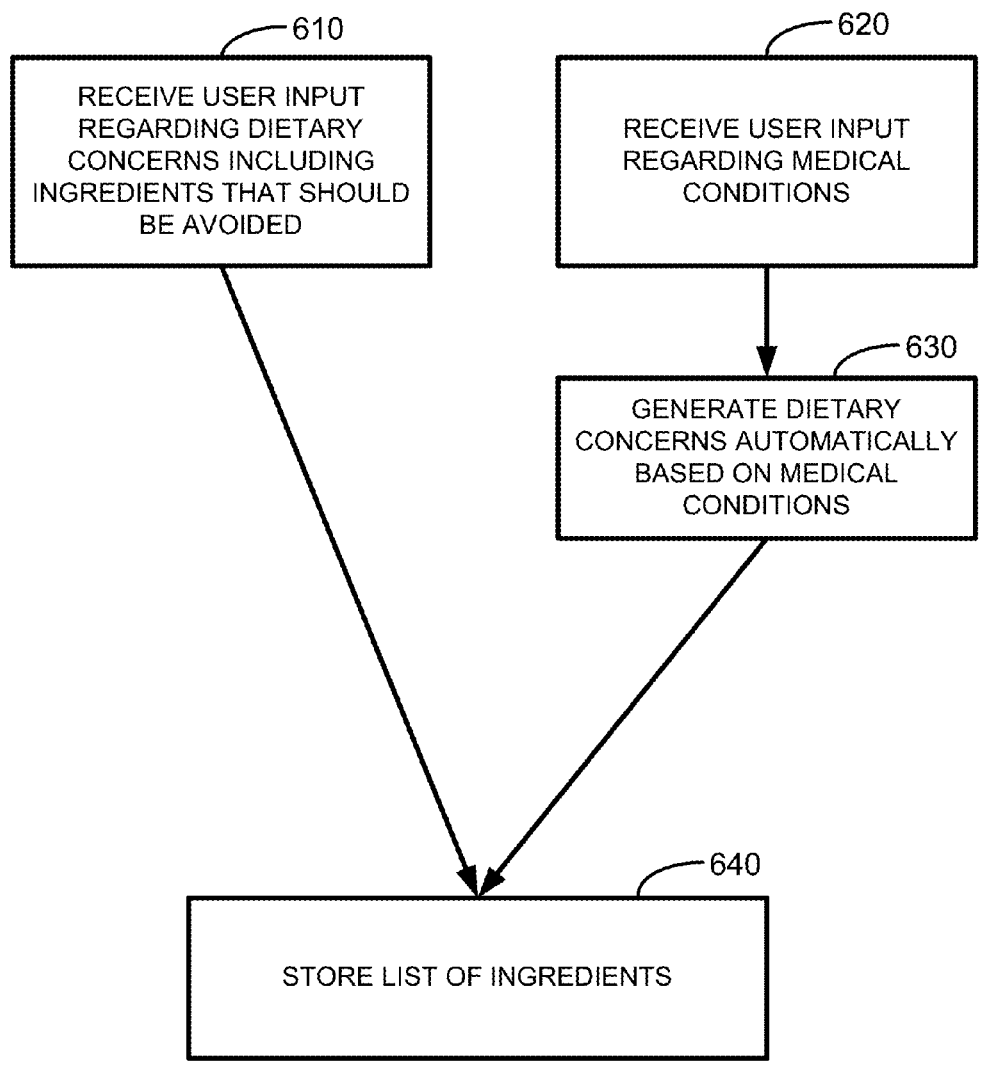
FIG. 6 is an exemplary flowchart of a method for generating a local list of ingredients.

FIG. 6 shows an exemplary flowchart for generating a stored list of ingredients on the user's mobile device. In process block 610, a user input is received regarding dietary concerns including ingredients that should be avoided. A variety of different user interfaces can be used for inputting such data including check boxes that the user can select. Input other than dietary concerns can also be used. In process block 620, the mobile device can also receive user input regarding medical conditions. For example, a user can check a box indicating that they have diabetes. Other medical conditions (e.g., high cholesterol) can also have check boxes associated therewith. In process block 630, a list of ingredients can be automatically generated based on the medical conditions. For example, based on selection of diabetes as a medical condition, foods that are high in sugar and starch can be avoided. The generated list can also include percentages of ingredients used as a threshold amount, so that if the threshold percentage is exceeded, then the menu item can be filtered out of the menu. Thus, for example, some salt in a menu item can be acceptable until it exceeds a predetermined percentage or quantity. In process block 640, a final list of ingredients is stored and can be a merged list between the user input generated ingredients and the automatically generated ingredients.

Figure 7:
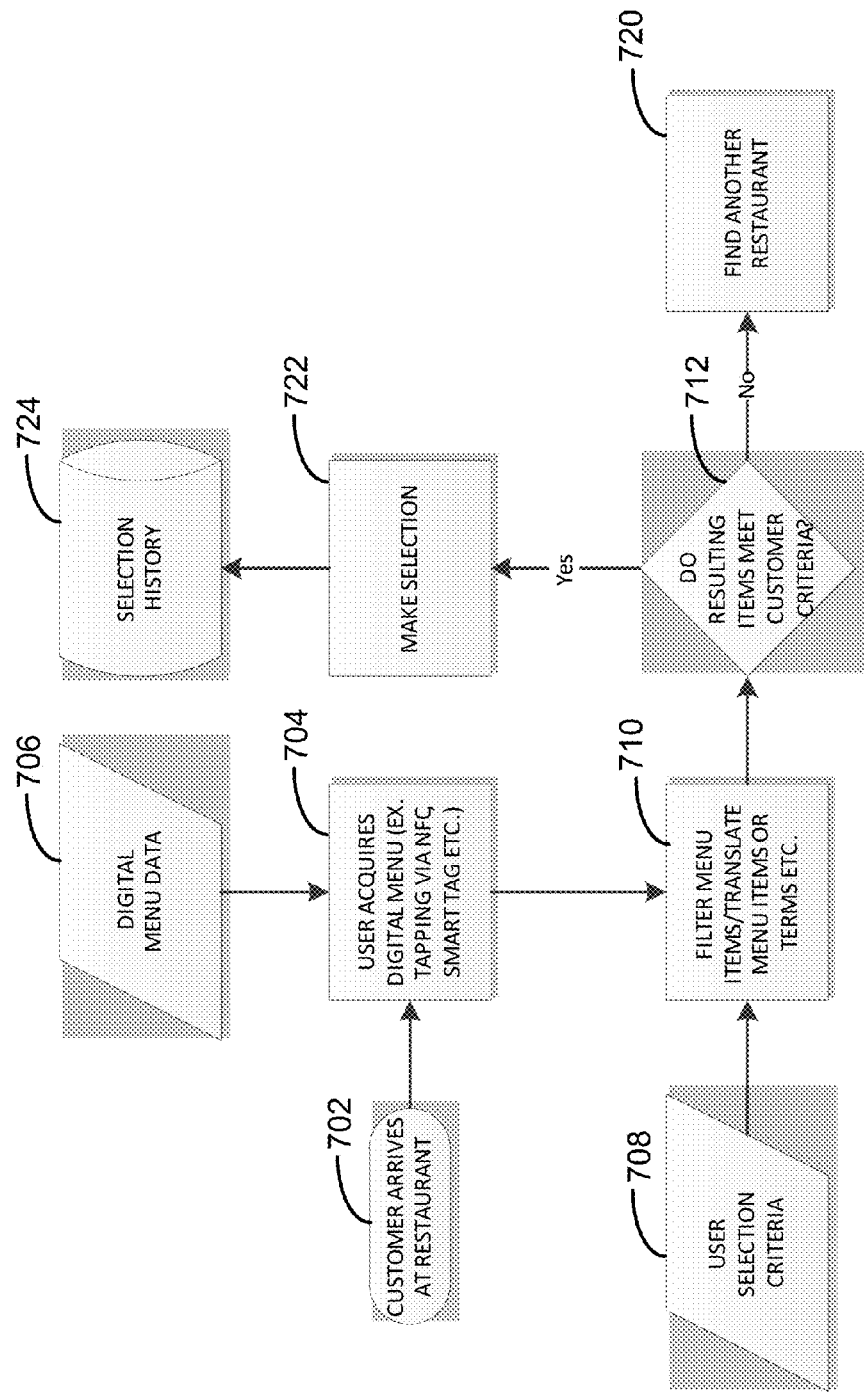
FIG. 7 is an exemplary detailed flowchart of filtering menu data.

FIG. 7 shows another exemplary embodiment of a system that can be used for filtering menu items. At process block 702, a user arrives at an eating establishment. At process block 704, the user's mobile device connects with a network associated with the eating establishment, such as by using NFC, smart tags, etc. Once a connection is established, digital menu data 706 can be passed to the mobile device. At 708, user selection criteria is entered through a predefined user interface. In process block 710, menu items can be filtered and/or translated. At decision block 712, a decision is made whether the results meet with the user's criteria. For example, the user can set parameters, such as a threshold number of menu items that should be available after filtering and, if the number is below the threshold, answering decision block 712 in the negative. In process block 720, a user is advised to find an alternative restaurant. Suggestions can also be provided. If process block 712 is answered in the positive, then the user is provided an opportunity to make menu selections in process block 722. Additionally, although not shown, if the customer's criteria is satisfied, coupons can automatically be generated by the restaurant and sent to the mobile device. Such coupons can then be displayed on the user's phone. Selection history can be stored in process block 724, for future use.

Figure 8:
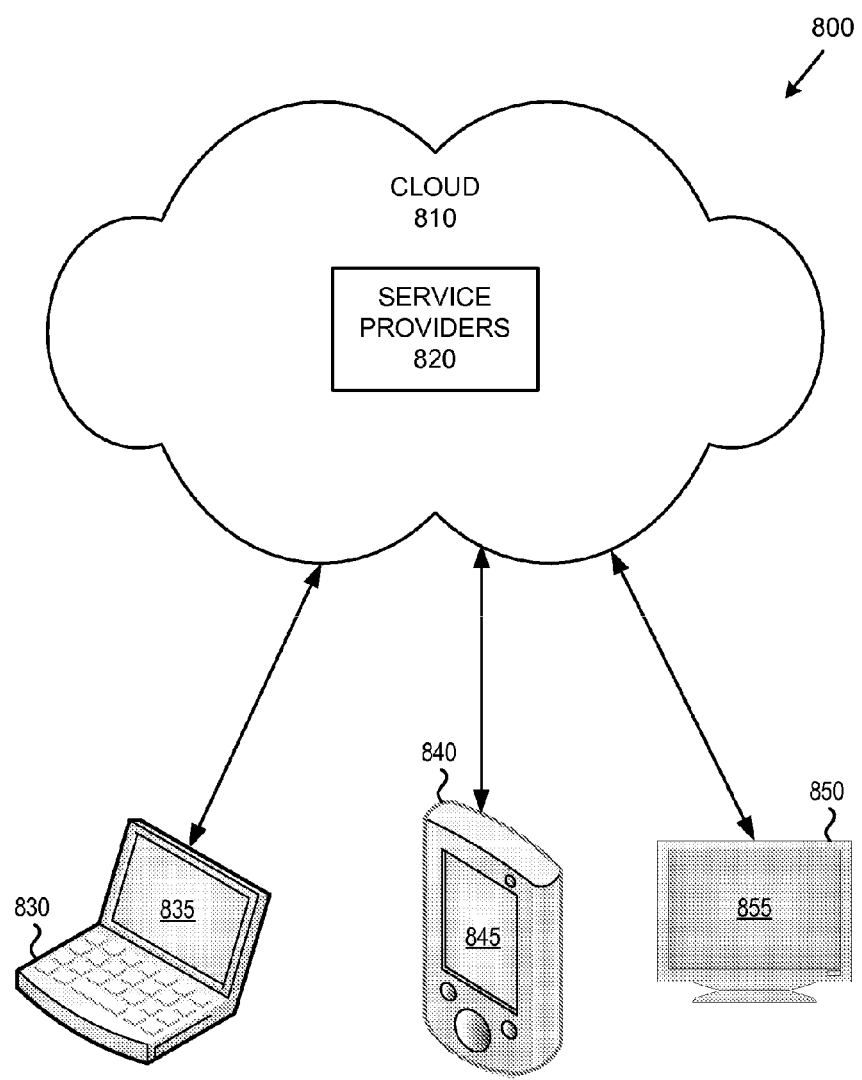
FIG. 8 is an example of how different devices can be used with the embodiments described herein.

FIG. 8 illustrates a generalized example of a suitable implementation environment 800 in which described embodiments, techniques, and technologies may be implemented.

In example environment 800, various types of services (e.g., computing services) are provided by a cloud 810. For example, the cloud 810 can comprise a collection of computing devices, which may be located centrally or distributed, that provide cloud-based services to various types of users and devices connected via a network, such as the Internet. The implementation environment 800 can be used in different ways to accomplish computing tasks. For example, some tasks (e.g., processing user input and presenting a user interface) can be performed on local computing devices (e.g., connected devices 830, 840, 850) while other tasks (e.g., storage of data to be used in subsequent processing) can be performed in the cloud 810. An example cloud service can be a translation service for a menu.

In example environment 800, the cloud 810 provides services for connected devices 830, 840, 850 with a variety of screen capabilities. Connected device 830 represents a device with a computer screen 835 (e.g., a mid-size screen). For example, connected device 830 could be a personal computer, such as desktop computer, laptop, notebook, netbook, or the like. Connected device 840 represents a device with a mobile device screen 845 (e.g., a small size screen). For example, connected device 840 could be a mobile phone, smart phone, personal digital assistant, tablet computer, or the like. Connected device 850 represents a device with a large screen 855. For example, connected device 850 could be a television screen (e.g., a smart television) or another device connected to a television (e.g., a set-top box or gaming console) or the like. One or more of the connected devices 830, 840, 850 can include touchscreen capabilities. Touchscreens can accept input in different ways. For example, capacitive touchscreens detect touch input when an object (e.g., a fingertip or stylus) distorts or interrupts an electrical current running across the surface. As another example, touchscreens can use optical sensors to detect touch input when beams from the optical sensors are interrupted. Physical contact with the surface of the screen is not necessary for input to be detected by some touchscreens. Devices without screen capabilities also can be used in example environment 800. For example, the cloud 810 can provide services for one or more computers (e.g., server computers) without displays.

Services can be provided by the cloud 810 through service providers 820, or through other providers of online services (not depicted). For example, cloud services can be customized to the screen size, display capability, and/or touchscreen capability of a particular connected device (e.g., connected devices 830, 840, 850).

In example environment 800, the cloud 810 provides the technologies and solutions described herein to the various connected devices 830, 840, 850 using, at least in part, the service providers 820. For example, the service providers 820 can provide a centralized solution for various cloud-based services. The service providers 820 can manage service subscriptions for users and/or devices (e.g., for the connected devices 830, 840, 850 and/or their respective users).

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., non-transitory computer-readable media, such as one or more optical media discs, volatile memory components (such as DRAM or SRAM), or nonvolatile memory components (such as hard drives)) and executed on a computer (e.g., any commercially available computer, including smart phones or other mobile devices that include computing hardware). Any of the computer-executable instructions for implementing the disclosed techniques as well as any data created and used during implementation of the disclosed embodiments can be stored on one or more computer-readable media (e.g., non-transitory computer-readable media). The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

We claim:

1. A method of analyzing food items available at a restaurant, comprising:
   storing a list of food criteria and a threshold number of menu items on a mobile device;
   receiving menu data associated with the food items available at the restaurant;
   filtering the menu data using the stored list of food criteria to a reduced set of food items;
   when a count of the reduced set of food items is greater than or equal to the threshold number of menu items, displaying the filtered menu data as a reduced set of food items on the mobile device; and
   otherwise, when the count of the reduced set of food items is less than the threshold number of menu items, directing a user to a different restaurant.

2. The method of claim 1, wherein the list of food criteria includes filter parameters based on dietary needs of a user.

3. The method of claim 1, further including translating the menu data into a language associated with the mobile device.

4. The method of claim 3, further including determining a destination language for the translation based on a language setting associated with the mobile device.

5. The method of claim 3, further including determining a source language based on a geographic location of the mobile device.

6. The method of claim 1, wherein the food criteria includes ingredients to which a user of the mobile device is allergic.

7. The method of claim 6, wherein the menu data includes ingredients used in the food items.

8. The method of claim 7, further including automatically comparing the ingredients to which the user is allergic to the ingredients in the food items and if a match is found, excluding from the reduced set of food items, any food item containing a matching ingredient.

9. The method of claim 1, further including receiving the menu data from a kiosk when the mobile device is placed within a predetermined distance from the kiosk.

10. The method of claim 1, further including receiving one or more medical conditions and generating at least a portion of the list of food criteria based on the one or more medical conditions.

11. The method of claim 1, further including determining if the menu data satisfies a predetermined number of criteria through comparison with the list of food preferences, and, if so, receiving coupons associated with the restaurant.

12. The method of claim 1, wherein directing a user to a different restaurant comprises displaying a list of other suggested restaurants to the user.

13. A method of interpreting menu items, comprising:
   receiving a list of menu items and menu ingredients associated with the menu items;
   comparing the list of menu ingredients with a stored list of ingredients on a mobile device;
   for a match between at least one of the menu ingredients and at least one of the stored list of ingredients, excluding a menu item containing the matched menu ingredient from a filtered list of menu items; and
   when a count of the reduced set of food items is greater than or equal to a stored threshold number of menu items, displaying, the filtered list of menu items on the mobile device; and
   otherwise, when the count of the reduced set of food items is less than the threshold number of menu items, directing a user to a different restaurant.

14. The method of claim 13, further including translating the menu items and menu ingredients for the filtered list of menu items into a different language.

15. The method of claim 13, further including receiving coupons associated with one or more items on the filtered list of menu items.

16. The method of claim 13, wherein the mobile device is a mobile phone.

17. The method of claim 13, further including sending the stored list of ingredients to a restaurant server and receiving at least one other suggested restaurant recommendation based on the stored list of ingredients.

18. The method of claim 13, further including receiving user input of ingredients that are problematic for the user and including such problematic ingredients on the stored list of ingredients.

19. The method of claim 13, further including receiving user input of medical conditions and automatically generating items on the stored list of ingredients based on the medical conditions.

20. A computer-readable storage device, not consisting of a signal, having instructions thereon to perform a method for interpreting a restaurant menu, the method comprising:
- receiving user input associated with medical-related concerns with ingredients;
- storing a list of ingredients on a mobile phone based on the received user input, the list of ingredients being problematic or undesirable ingredients for a user to consume;
- storing a threshold number of menu items;
- connecting the mobile phone to a restaurant network;
- receiving a list of menu-item ingredients and associated menu items from the restaurant network;
- comparing, on the mobile phone, the list of menu-item ingredients to the stored list of ingredients;
- displaying menu items on the mobile phone associated with menu-item ingredients that do not match ingredients on the stored list so that a reduced list of menu items is displayed; and
- directing a user to a different restaurant when a count of the reduced list of menu items is less than the threshold number of menu items.

* * * * *